United States Patent [19]

Wilder et al.

[11] 4,041,890
[45] Aug. 16, 1977

[54] INDEXING APPARATUS FOR A RECORD AND/OR PLAYBACK DEVICE

[75] Inventors: Leslie N. Wilder, Fairfield; Anthony Ciaraldi, Huntington, both of Conn.

[73] Assignee: Dictaphone Corporation, Rye, N.Y.

[21] Appl. No.: 678,705

[22] Filed: Apr. 20, 1976

[51] Int. Cl.² ............................................. G01D 18/00
[52] U.S. Cl. ............................................... 116/114 R
[58] Field of Search .............. 116/114 R, 67 A, 67 R; 352/170, 171, 172; 360/132, 31, 133, 134, 135

[56] References Cited

U.S. PATENT DOCUMENTS

| | | | |
|---|---|---|---|
| 3,040,135 | 6/1962 | LaForest | 360/82 |
| 3,630,170 | 12/1971 | Christo | 116/114 R |
| 3,726,492 | 4/1973 | Koizjmi | 352/172 |

*Primary Examiner*—S. Clement Swisher
*Assistant Examiner*—Denis E. Corr
*Attorney, Agent, or Firm*—Curtis, Morris & Safford

[57] ABSTRACT

Indexing apparatus for indicating the amount of information recorded on or transcribed from a record medium. A non-linear index scale having, for example, time markings thereon, is moved into view concurrently with the rewind movement of the record medium to a beginning location in preparation of a reproducing, or transcribing operation. The length of index scale viewable by an operator represents the amount of recorded information to be transcribed; and as transcription proceeds, the scale remains stationary and is scanned by an indicator. For an information recording operation, the index scale is moved fully into view and is scanned by the indicator.

10 Claims, 2 Drawing Figures

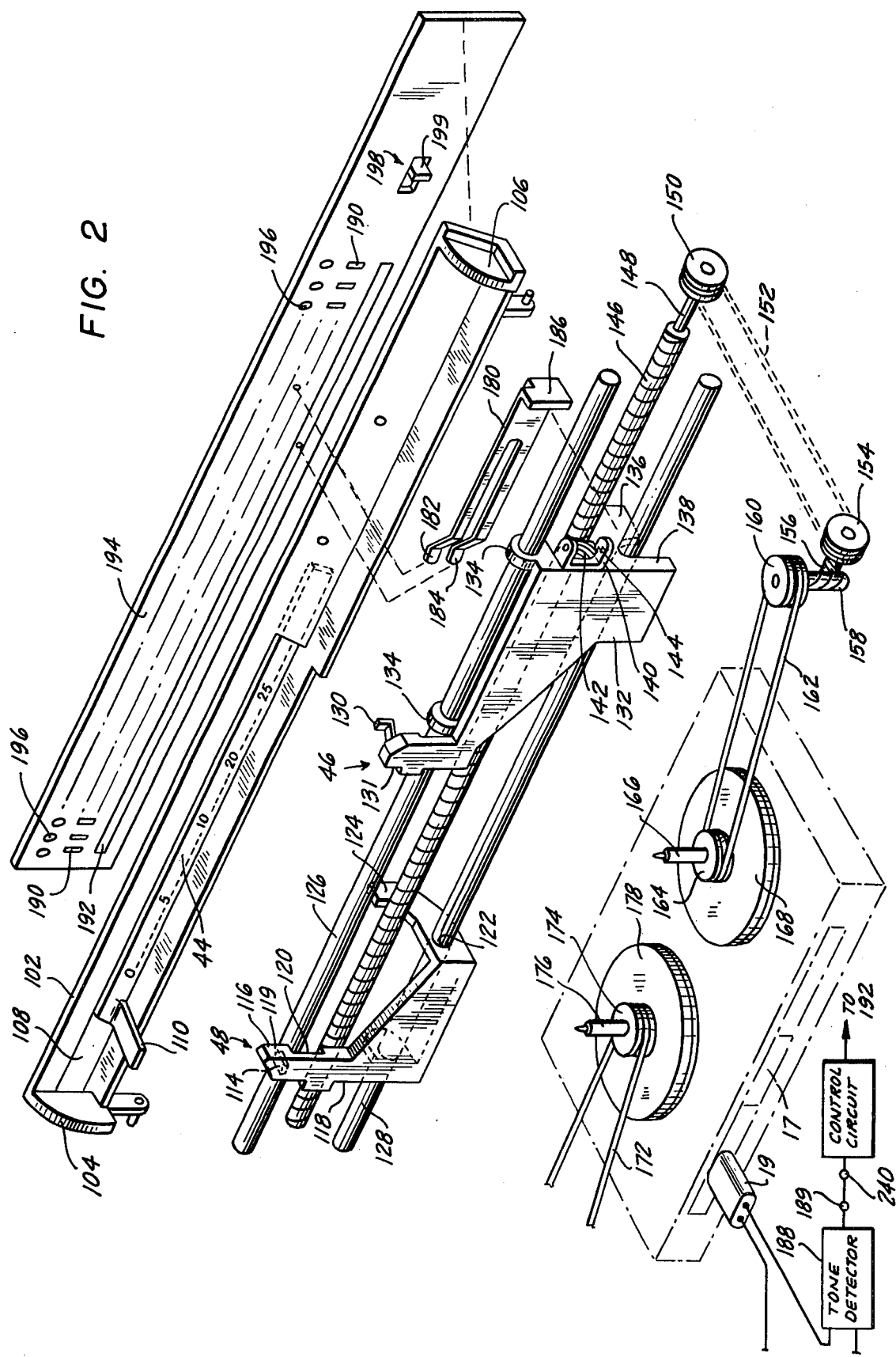

INDEXING APPARATUS FOR A RECORD AND/OR PLAYBACK DEVICE

BACKGROUND OF THE INVENTION

This invention relates to recording and/or playback apparatus and, more particularly, to indexing apparatus for indicating the amount of information recorded on or transcribed from the record medium used in such recording and/or playback apparatus.

In the use of recording/playback devices for dictation purposes, an index, such as a scale, often is used to indicate the amount of information that has been recorded on the record medium. In many instances, an operator desires to indicate the location of various instructions along the record medium, such as by selectively marking the scale. Typical of such instructions are inserts, deletions, the end of a selected piece of dictation, and the like. Marking of the scale to indicate instructions generally is preferred over the physical marking of the record medium, as by an ink or crayon mark, by a perforation, etc.

The prior art has developed improved indicating mechanisms which scribe marks on an indicating slip usually incorporated into the dictation apparatus. Typically, the slip is incorporated into the index scale, graduated in minutes and marked by, for example, a pencil or the like, by the operator. In many dictation devices, automatic marking devices also have been incorporated into the apparatus. Accordingly, the operator merely need actuate suitable controls on the apparatus to effect a corresponding mark on the index scale.

Although the marked index scale provides a generally adequate indication to a transcriptionist of the relative location of instructions on the record medium, there is the possibility that the marked index scale will be lost or otherwise separated from the record medium. This means that the transcriptionist cannot be apprised of such instructions at the outset of a transcribing operation, thereby contributing to possible confusion, erroneous transcription of dictated information or inordinate delay in completing the transcription.

In an attempt to overcome this problem attending separate, marked index scales, it has been proposed to record predetermined instruction signals on the record medium, these predetermined signals performing substantially the same function as the markings on the index scale. For example, the predetermined instruction signals can be recorded as tone signals which are not audibly sensed during playback. In preparation of a transcribing operation, the record medium is rapidly scanned to detect the presence of these tone signals and to mark an index strip which is scanned in synchronism with the scanning of the record medium when each such signal is detected. One example of such an instruction indicator apparatus is described in U.S. Pat. No. 3,040,135. Various types of marking mechanisms and index strips can be used, and one system proposes a thermosensitive index scale.

Although the technique of recording instruction signals substantially avoids the problem of lost index slips, it is necessary to provide a fresh index slip for each change in the record medium. For example, if the record medium is a magnetic belt, the scanning of that belt will mark one index slip, and the next belt which is transcribed requires the preparation of another index slip. Similarly, if the record medium is magnetic tape, such as a tape cassette, each new cassette requires the preparation of an associated index slip. Hence, index slips must be kept in ready supply.

Another problem attending the marking of index slips in response to recorded instruction signals is that of insuring that the marks on the index scale are in correspondence with the instructions on the record medium. For example, if it is assumed that during recording or transcription the index scale is scanned by an indicator in a first, for example, left-to-right, direction, then during a reverse or backspace operation or in preparation for transcription, wherein it is necessary to position the playback head at the beginning portion of the record medium, the indicator scans the scale in a second opposite, or right-to-left, direction. The problem arises in first positioning the indicator at some position along the scale before the backspace operation commences if less than all of the record medium has been used for recording. That is, if the indicator is not positioned exactly at the location corresponding to the amount of medium which had been used, then the marks on the scale will not correspond to the recorded instruction locations, and at the conclusion of the backspace operation the indicator may not be located at the start, or zero, position.

OBJECTS OF THE INVENTION

Therefore, it is an object of the present invention to provide improved indexing apparatus for indicating the amount of record information that has been driven past a predetermined position which overcomes the aforenoted problems.

Another object of this invention is to provide indexing apparatus including an instruction indicator for use in dictation apparatus which avoids the problem of preparing a fresh index slip for each medium to be transcribed.

A further object of this invention is to provide improved instruction indicator apparatus for use in dictation apparatus wherein a single index medium is used repeatedly, this same index medium being electrically marked and cleared for each record medium to be transcribed.

A still further object of this invention is to provide improved indexing apparatus for dictation apparatus wherein a proportionate amount of a scale is moved into view in preparation of a transcribing operation, corresponding to the amount of recorded information to be transcribed.

An additional object of this invention is to provide an improved indexing apparatus for dictation apparatus wherein an index scale is scanned during recording and reproduction, the index scale first being positioned to a reference location corresponding to the amount of recorded information that is to be transcribed.

Another object of this invention is to provide an improved scanning mechanism for an instruction indicator system to be used in dictation apparatus.

Various other objects, advantages and features of the present invention will become apparent from the ensuing detailed description, and the novel features will be particularly pointed out in the appended claims.

SUMMARY OF THE INVENTION

In accordance with the present invention, indexing apparatus for indicating the amount of record medium that has been driven past a predetermind position is provided, including a scanning mechanism for scanning an index scale in synchronism with the scanning of the record medium; and a scale positioning mechanism to position the scale at a relative reference location corresponding to a starting location of the record medium. The indexing apparatus is particularly useful in dictation apparatus to indicate the amount of information recorded on or transcribed from the record medium, and is particularly adapted to be used in conjunction with an instruction indicator device whereby instruction indications are aligned with the index scale in correspondence with the relative locations of recorded instructions on the record medium.

BRIEF DESCRIPTION OF THE DRAWINGS

The following detailed description, given by way of example, will best be understood when read in conjunction with the accompanying drawings in which:

FIG. 2 is a perspective view of portions of the indexing apparatus used in the dictation apparatus of FIG. 1 and which includes the present invention.

DETAILED DESCRIPTION OF A PREFERRED EMBODIMENT

Figure 1:
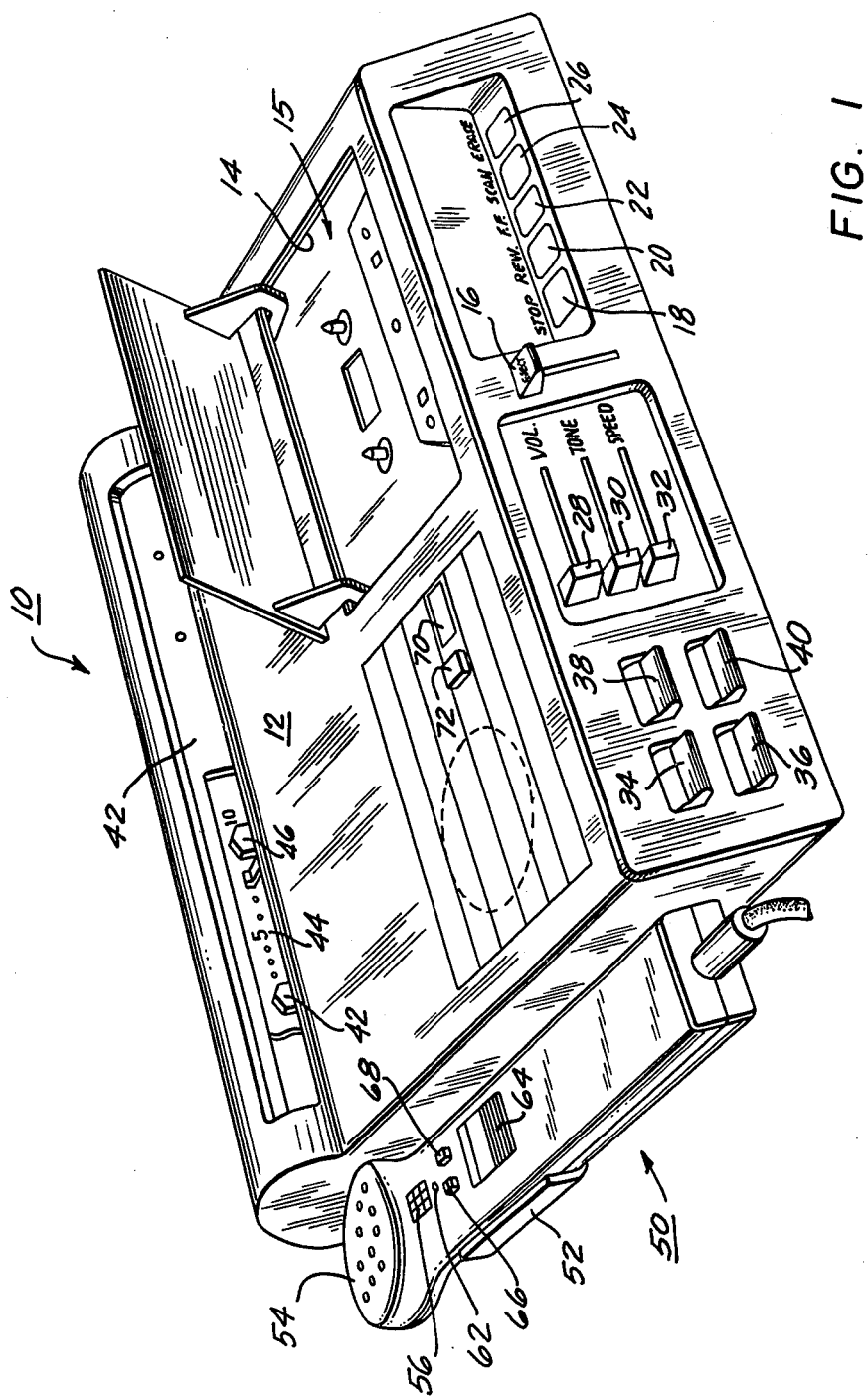
FIG. 1 is a perspective view of dictation apparatus in which the present invention finds ready application.

Referring now to the drawings, wherein like reference numerals are used throughout, and in particular to FIG. 1, there is illustrated a preferred embodiment of recording and/or playback apparatus 10, which can be used for the purpose of dictation and/or transcription, and a housing 12 upon which the various mechanical elements and electronic circuitry are supported. FIG. 1 also shows various operator-actuated elements, or control switching devices, to effect dictation and/or playback operations. The record medium for the illustrated dictation/transcribing apparatus is magnetic tape of the type which is self-contained in a cassette housing 15. Such a magnetic tape cassette is conventional and is comprised of a supply reel and a take-up reel. The cassette housing is provided with various apertures to accommodate reel drive spindles to drivingly engage the supply and take-up reels, and to accommodate a record/playback transducer, or head, which is inserted into contact with the tape. As is conventional, additional apertures are provided to receive an erase head and a pressure roller, the latter cooperating with a capstan for moving the tape past the various heads. In order to accommodate such a tape cassette, dictation/transcribing apparatus 10 is provided with a cassette holder compartment 14 including a cassette support platform, various cassette guide mechanisms and a door to the compartment which when closed shields the cassette and the machine elements during operation. Although the illustrated dictation/transcribing apparatus 10 is particularly adapted to operate in conjunction with a tape cassette, it should be appreciated that other types of record media, such as belts, discs, and the like, can be used with the present invention.

Typical of the operator-controlled elements is an eject control 16 which, when actuated, serves to lift the door to cassette holder compartment 14, and to eject cassette 15 for removal from the apparatus. A series of control elements or switches, such as push-buttons or touch-sensitive devices, is provided for an operator to selectively control various machine operations. For example, a stop control 18 is provided to terminate the operation of dictation/transcribing apparatus 10 and to place the apparatus in a quiescent mode. When stop control 18 is actuated, tape movement is arrested, the record/playback head is withdrawn from tape contact and dictation/transcribing apparatus 10 is ready for subsequent placement in another operating mode.

The series of control elements also includes a rewind control 20 for rewinding the tape from its take-up reel within the cassette housing to its supply reel, as well as a fastforward control 22 to rapdily move the tape from its supply reel to its take-up reel. In addition, a scan control 24 electronically scans the moving tape for the presence of predetermined control signals thereon. These control signals represent various instructions which are useful in guiding a transcriptionist during a transcribe operation. Hence, when actuated, the scan control 24 causes appropriate control apparatus to detect and indicate the relative locations of such control signals, as will be described in greater detail hereinbelow.

An erase control 26 is provided for erasing information previously recorded on the magnetic tape.

Another series of operator-actuated controls is provided to enable an operator to selectively control the audio characteristics of reproduced information. To this effect, a volume control 28, a tone control 30 and a tape-speed control 32 are provided to perform the respective indicated functions.

Yet another series of operator-actuated controls is provided, including an on/off switch 34, a sepaker control switch 36 and a conference/dictate switch 38. The illustrated dictation/ transcribing apparatus 10 is provided with a loudspeaker; and, additionally, a microphone assembly 50 which is used with the apparatus for dictation is also provided with a loudspeaker. Accordingly, speaker control switch 36 permits an operator to selectively actuate the loudspeaker of the dictation apparatus or the loudspeaker of the microphone assembly for the reproduction of sound, as desired. Conference/dictate control switch 38 is provided to selectively enable an operator of the dictation apparatus to use the apparatus to record a conference. In the conference mode, the amplification gain of the recording circuits is increased.

An optional telephone control switch 40 is provided to selectively enable an operator to use the dictation apparatus to record information directly from a telephone line.

Control indicators 42 are provided at the rear of dictation/transcribing apparatus 10 and include various indicators, such as light sources, for apprising an operator of the condition of the machine. Positioned adjacent control indicators 42 is a slide index 44 including a scale and a movable slide lever 46 which traverses the scale. Slide lever 46 moves in synchronism with the movement of the cassette tape so as to indicte to the operator his present position in respect to the full length of the tape. Instruction indicators are juxtaposed slide index 44, the instruction indicators being selectively energized during a tape scanning operation. These indicators, and their operation, are described more fully below with reference to FIG. 2.

Microphone assembly 50 is electrically connected to the control electronics included in apparatus 10. For convenience, microphone assembly 50 is supported on a microphone support bracket 52 which may be coupled to the machine housing 12. Microphone assembly 50 includes a sound transducer 54 for converting audio information into corresponding electrical signals, and a loudspeaker 56, described above. In addition, various operator-controlled actuating elements 62, 64, 66 and 68 are provided to enable an operator to control a dictation operation merely by the selective operation of the indicated elements. These elements include a dictate control switch which, when actuated, energizes corresponding components in apparatus 10 to permit information to be recorded on the magnetic tape; a rewind control switch for high speed rewind of tape; a dictate indicator to apprise an operator of the operating mode in which apparatus 10 is conditioned; a forward/stop control switch to transport tape from the supply reel to the take-up reel; and a fast-forward switch for the fast forward movement of tape. In addition, one or more instruction switches are provided, and these switches, when actuated, place predetermind control signals on the tape, indicating that succeeding information is intended to be an instruction, or that the end of a selected piece of dictation has been reached. It is these control signals which are detected in response to the actuation of the scane control 24.

As shown in FIG. 1, dictation/transcribing apparatus 10 is provided with a tape footage counter 70, which may be a conventional digital counter representing the amount of tape which has been transported, and a reset control 72 adapted to reset the count displayed by the counter 70 to a reference, or zero, indication.

The functions of the aforementioned operator-control elements are self-evident. Accordingly, in the interest of brevity, further description thereof is not provided.

Although particularly adapted for a dictation operation, apparatus 10 also is fully capable of performing a transcribinhg operation. For this purpose, a foot switch (not shown) and, optionally, headphones are provided. Actuation of the foot switch advances the tape in cassette 15 either in a playback mode, a rewind mode or a fast-forward mode. If desired, when used as a transcribing device, controls necessary for recording information on the tape are omitted.

The indexing apparatus which can be used with dictation/transcribing apparatus 10 now will be described with reference to FIG. 2. Slide index strip 44 is seen to have time indications inscribed or printed thereon and is adapted to be slidable in a frame 102. As may be appreciated, these time indications may be nonlinearly spaced along the length of strip 44 to account for changing amounts of tape travel for each rotation of the take-up or supply reels (from which an indicating slide lever is driven) as the diametr of the tape spools change. Frame 102 includes side members 104 and 106 and is positioned in the rear of dictation/transcribing apparatus 10. A window 108 in frame 102 permits an operator to view strip 44.

A projection 110 from index strip 44 extends outwardly of the frame 102, as shown, and is adapted to engage a notch 114 in an upstanding portion 48 of arm 116 fixed to a carriage 118. Carriage 118 is slidable on a pair of guide rails 126, 128 and includes a guide 120 supported on rail 126, a body portion having a bore 122 for rail 128, and the upstanding portion 48 which is used as a reference for index scale 44. A leg 124 extends rearwardly of carriage 118 which is substantially L-shaped when viewed from above. Guide rails 126 and 128 extend the length of frame 102 and are supported in housing 12 of dictation/transcribing apparatus 10.

Another carriage 132 is provided with support guides 134 and 138 to slidably support the carriage on rails 126 and 128. An indicator portion 130, corresponding to movable slide lever 46 (shown in FIG. 1) extends upwardly from carriage 132 and is adapted to transverse index scale 44 and a leg 136 extends rearwardly of the carriage. Carriage 132 is drivingly coupled to a lead screw 146 by a worm gear 142 mounted in a bracket 140 secured to the carriage. As shown, bracket 140 includes upper and lower support members to receive worm gear 142 and a spring 144 to bias the worm gear toward lead screw 146 so as to develop sufficient friction therebetween, whereby the worm gear and bracket 140 are driven when lead screw 146 is rotated. However, this friction is overcome when, for example, a manual force is exerted on carriage 132 to slide this carriage in either direction along guide rails 126 and 128. When slid in response to this manual force, worm gear 142 rotates to permit the substantially free movement of carriage 132 with respect to lead screw 146.

Opposing faces 119 and 131 of portion 48 on carriage 118 and indicator 130, respectively, are adapted to abut against each other. When lead screw 146 is driven to drive carriage 132 from right to left, carriage 118 thus can be pushed along guide rails 126 and 128 by carriage 132. When carriage 132 moves in the opposite direction, for example, when lead screw 146 is oppositely driven, carriage 118 remains in the farthest position to which it was pushed and faces 119 and 131 separate. If carriage 118 is manually pushed from left to right, portion 48 pushes indicator 130, and carriage 118 drives carriage 132 along guide rails 126 and 128.

An L-shaped wiper 180, formed of electrically conductive material, such as copper, is secured to rearwardly extending leg 136 of carriage 132 by element 186. Wiper 180 is a bifurcated element having wiper contacts 182 and 184.

Instruction indicator apparatus is provided, including a linear array of selectively energizable light emitting sources 196. These light sources are mounted on an insulated support 194 which may be secured to and supported by frame 102. Alternatively, insulated support 194 is suitably mounted and supported in the rear portion of housing 12 of dictation/transcribing apparatus 10. Each light source 196 is electrically coupled to a contact, or conductive land 190, mounted on insulated support 194. Preferably, each land 190 is in vertical alignment with its associated light source 196.

A contact strip 192 is mounted on insulated support 194 and extends longitudinally of the support. In FIG. 2, contact strip 192 is positioned beneath the respective lands 190; and in an alternative embodiment, contact strip 192 is positioned above lands 190. The relative positioning of lands 190 and strip 192 enables wiper contacts 182 and 184 to traverse simultaneously lands 190 and strip 192, respectively. As wiper 180 is driven by carriage 132, wiper contact 184 is in continuous contact with strip 192, while wiper contact 182 sequentially contacts successive lands 190.

A switch 198, including a switch actuator 199 contacted by leg 136 extending rearwardly of carriage 132, is supported on insulated support 194. As will be described in greater detail hereinbelow, the abutment of leg 124 against switch actuator 199 opens switch 198.

In a preferred embodiment, strip 192 is supplied with actuating signals produced when predetermined tones recorded on magnetic tape 17 in cassette 15 are detected. These predetermined tones are recorded by an operator during a dictation operation to represent the locations of particular instructions, as discussed above. The circuitry used for recording such predetermined tones is known and forms no part of the present invention per se. During an instruction-scanning operation, these recorded tones are picked up by a suitable playback head 19 and are detected by a tone detector 188 electrically coupled to head 19. Tone detector 188 may be of conventional construction and produces an actuating signal at its output terminal 189 in response to each tone signal detected during the instruction-scanning operation. Output terminal 189 is, in turn, coupled to an input terminal 240 of a control circuit 200 which supplies the actuating signal to strip 192 for the selective energization of a light source 196.

The scanning of lands 190 by wiper 180 is performed when carriage 132 is driven in synchronism with the electronic scanning of tape 17 in cassette 15. This synchronism is achieved by driving lead screw 146 concurrently with the tape spools within the cassette 15. To this effect, a drive shaft 148 of lead screw 146 is coupled to a drive pulley 150 having a drive belt 152 coupled to a pulley 154 having a gear 156 associated therewith disposed in meshing engagement with a gear 158 coupled to a drive pulley 160. Drive pulley 160 is coupled by a drive belt 162 to a take-up pulley 164 mounted so as to be rotated with take-up spindle 166 insertable in a suitable cassette aperture, and take-up reel support member 168. Of similar construction is a supply pulley 174 coupled to a supply spindle 176 and a supply reel support member 178 for simultaneous rotation. In addition, a drive belt 172 couples supply pulley 174 to further apparatus (not shown). Supply spindle 176 is also insertable through an aperture into the supply reel hub of cassette 15.

The tape transport mechanism included in dictation/transcribing apparatus 10 for selectively driving the supply and take-up reels of cassette 15 in forward, fast-forward and rewind directions is described in greater detail in copending application Ser. No. 678,704, filed Apr. 20, 1976. Suffice it to say that when the take-up reel is rotated, take-up pulley 164 is correspondingly rotated to thereby drive lead screw 146 in synchronism with the movement of tape 17 in cassette 15.

The operation of the illustrated apparatus now will be described in greater detail. When the dictation/transcribing apparatus is used for a dictation operation, carriage 132 is slid manually to its left-most position. The correspondingly drives carriage 118 to withdraw index scale 44 completely, the index scale thus being fully viewable through window 108. As the dictation operation proceeds, take-up pulley 164 drives lead screw 146 in a direction to move carriage 132 away from carriage 118. Hence, slide lever 46 scans index scale 44 to provide an indication of the amount of information that has been recorded on tape 17 and to represent the present position of the operator relative to the full length of the tape.

After dictating information onto tape 17 in cassette 15, including the recording of instruction tone signals, cassette 15 is ready for transcription. Preferably, tape 17 is not rewound at the conclusion of a dictation operation. Accordingly, when cassette 15 is disposed in dictation/transcribing apparatus 10 for a transcribing operation with tape 17 disposed in its farthest position reached during the dictation operation, actuation of scan control 24 rewinds tape 17 past playback head 19. In one embodiment, playback head 19 is separate from the normal playback head used to reproduce audio information during the transcribing operation.

Before rewinding tape 17, carriages 118 and 132 are slid to their right-most position such that index slide 44 is not viewable through window 108. As tape 17 is rapidly rewound, lead screw 146 is driven to slide carriage 132 and, thus carriage 118 along guide rails 126 and 128 from their initial right-most position. Hence, leg 136 extending from carriage 132 moves away from switch actuator 199 to close switch 198. As the carriages slide along guide rails 126 and 128, index scale 44 slides into view in window 108 of frame 102 and wiper 180 scans successive lands 190. When a predetermined tone is picked up from tape 17 by head 19 and detected by tone detector 188, an actuating signal is supplied to control circuit 200. As soon as wiper contact 182 arrives in electrical contact with a land 190, this actuating signal is transmitted from strip 192, through wiper 180 to the contacted land 190 to energize an associated light source 196.

This scanning operation continues until tape 17 has been fully rewound onto its supply reel in cassette 15, carriages 118 and 132 have reached their left-most positions corresponding to the amount of tape to be transcribed, and the tape transport mechanism is deactuated. In this condition, the portion of index scale 44 viewable through window 108 in frame 102 represents the amount of information dictated onto tape 17 which is to be transcribed (which, of course, may be any amount equal to or less than the total length of tape) and indicator 130 is at the zero reference mark on index scale 44, corresponding to the initial or zero reference position on tape 17 from which transcription now proceeds. The energization of selective ones of light sources 196 indicate to the the transcriptionist the relative locations along the length of tape 17 at which particular instructions are provided. Accordingly, the entire transcribing operation can be planned in advance by the transcriptionist, thus facilitating and expediting efficient transcription.

As transcription proceeds, tape 17 is transported from its supply reel to its take-up reel by the tape transport mechanism which also drives lead screw 146 in its opposite direction. Carriage 132 now is driven from left to right and indicator 130 traverses index scale 44 to indicate to the transcriber that portion of tape relative to its entire length which is then being transcribed. Carriage 132 continues to be driven in the right-hand direction until the completion of the transcribing operation at which time the carriage will return to its initial right-most position. A suitable stop is provided on frame 102 to prevent further movement of carriage 132 when it has reached its right-most position.

While carriage 132 is driven in the left-to-right direction by lead screw 146, carriage 118 remains stationary at its left-most position. At the conclusion of the transcribing operation, the transcriptionist slides carrige 118 in the left-to-right direction to retract index scale 44. When carriage 118 reaches its right-most position, determined by the abutment of portion 48 against indicator 130, leg 124 contacts switch actuator 199 to open switch 198, thereby resetting, or de-energizing, all of the light sources 196. Hence, the instruction indicator apparatus is ready for a subsequent scanning and transcribing operation.

During the transcribing operation, tone detector 188 does not detect the predetermined instruction tone signals which have been recorded on tape 17. In one embodiment, head 19 and/or tone detector 188 operate only during the scanning operation and are de-energized during the transcribing operation, thereby making these elements insensitive to such recorded tone signals. In an alternative embodiment, tone detector 188 is provided with a filter circuit whose frequency range is higher than the frequency of the predetermined tone signals which are reproduced during transcription. Since tape 17 is transported at a higher speed during scanning than during transcribing (i.e., playback), the frequency of these tone signals reproduced during a scanning operation is much higher than when reproduced during a transcribing operation. For example, if the predetermined tone signal is recorded as a 60Hz signal, and if the tape speed during a scanning operation is ten times the tape speed during a transcribing operation, then this 60Hz signal is reproduced as a 600Hz signal during scanning. If tone detector 188 includes a high-pass filter circuit, the 600Hz tone is detected during the scanning operation but the 60Hz tone reproduced during a transcribing operation is not detected.

Carriages 118 and 132 can be returned to their beginning, or right-most position, at any time merely by manually sliding carriage 118 in the left-to-right direction. In general, this is done by an operator (transcriptionist) of dictation/transcribing apparatus 10 after the completion of one transcribing operation and in preparation of another. This movement of carriage 118 retracts index scale 44 to its initial position which is not viewable through window 108 and, additionally, moves carriage 132 in the right-hand direction. The driving force exerted on carriage 132 is sufficient to overcome the frictional force between worm gear 142 and lead screw 146, thereby permitting worm gear 142 to rotate as carriage 132 slides along guide rails 126 and 128. Movement of these carriages continues until they reach the right-most, or initial, position.

Carriages 118 and 132 can be manually located at their left-most position by an operator (dictator) in preparation for each dictating operation. This fully withdraws index scale 44 which is scanned by indicator 130 as dictation proceeds.

While the present invention has been particularly shown and described with reference to a preferred embodiment thereof, it will be readily apparent to one of ordinary skill in the art that various changes and modifications in form and details can be made without departing from the spirit and scope of the invention. For example, worm gear 142 mounted on carriage 132 can be replaced by other gear-follower devices or other follower means for permitting carriage 132 to be driven by lead screw 146, yet enabling the carriage to slide along the lead screw when a force is exerted thereon. As another example of a further modification of the illustrated apparatus, although light sources are selectively energized when tape 17 is scanned in a rewind direction, it should be apparent that the light sources can be energized when tape 17 is scanned in a fast-forward direction. Furthermore, it should be recognized that the indexing apparatus can be used without the instruction indicators and, therefore, support 194, light sources 196, wiper 180 and associated electronics may be omitted, if desired. Therefore, it is intended that the appended claims be interpreted as including the foregoing as well as various other changes and modifications.

What is claimed is:

1. Indexing apparatus for providing an indication of the amount of record medium which has been driven past a predetermined position, comprising:
   a first carriage movable along a predetermined rectilinear path;
   driving means for bidirectionally driving said first carriage along said predetermined rectilinear path in synchronism with the relative movement of said record medium;
   a second carriage movable along said predetermined rectilinear path, said second carriage being moved when said first carriage is driven in one direction; and
   index means coupled to and movable with said second carriage for displaying at least a portion thereof representing said amount of record medium which has been driven past said predetermined position.

2. Indexing apparatus as defined in claim 1 wherein said indexing means includes demarcations thereon representing predetermined quanta of record medium; and said first carriage includes an indicator thereon for scanning said indexing means when said first carriage is driven in an opposite direction.

3. Indexing apparatus as defined in claim 2 wherein said first and second carriages initially are disposed at one end of said predetermined path and said first carriage is driven in said opposite direction away from said second carriage during a recording operation.

4. Indexing apparatus as defined in claim 2 wherein said driving means comprises a lead screw; and follower means coupled to said first carriage and in engagement with said lead screw to move said first carriage as said lead screw is driven.

5. Indexing apparatus as defined in claim 4 wherein said follower means comprises a gear in meshing engagement with said lead screw; means for supporting said gear on said first carriage; and a spring for biasing said gear toward said lead screw, whereby the frictional forces exerted on said gear prevent said gear from rotating when said lead screw is driven, said frictional forces being overcome by a force exerted on said first carriage to slide said first carriage longitudinally of said lead screw.

6. Indexing apparatus for use in a dictation and/or transcribe system for providing an indication of the amount of information which has been dictated and/or transcribed from a recording tape, comprising:
   a first carraige bidirectionally driven along a predetermined path;
   a second carriage driven by said first carriage along said predetermined path in only one direction;
   driving means for driving said first carriage in said one direction when said recording tape is driven in a reverse direction and for driving said first carriage in a second opposite direction when said tape is driven in a forward direction; and
   an index scale coupled to and movable with said second carriage.

7. Indexing apparatus as defined in claim 6 wherein said first and second carriages and said index scale are positionable at one end of said predetermined path at the commencement of a dictation operation; and said driving means drives said first carriage away from said second carriage as said recording tape is driven in said forward direction.

8. Indexing apparatus as defined in claim 7 wherein said first and second carriages and said index scale are positionable at the other end of said predetermined path at the commencement of a transcribing operation; and said driving means drives said first carriage in said one direction as said recording tape is driven in said reverse direction.

9. Indexing apparatus as defined in claim 8 wherein said driving means comprises a lead screw bidirectionally driven in synchronism with the driving of said tape;

and said first carriage includes follower means coupled thereto and in engagement with said lead screw to move said first carriage as said lead screw is driven.

10. Indexing apparatus as defined in claim 9 wherein said follower means comprises a gear in meshing engagement with said lead screw; means for supporting said gear on said first carriage; and a spring for biasing said gear toward said lead screw, whereby the frictional forces exerted on said gear prevent said gear from rotating when said lead screw is driven, said frictional forces being overcome by a force exerted on said first carriage to slide said first carriage longitudinally of said lead screw.

* * * * *